United States Patent
Liang et al.

(10) Patent No.: US 10,890,432 B2
(45) Date of Patent: Jan. 12, 2021

(54) DIGITAL DISPLACEMENT SENSOR AND DISPLACEMENT MEASURING METHOD THEREOF

(71) Applicant: Monolith Electric (Changzhou) Co., Ltd., Changzhou (CN)

(72) Inventors: Lei Liang, Changzhou (CN); Qing Xia, Changzhou (CN); Weijie Wu, Changzhou (CN); Chunlei Yu, Changzhou (CN)

(73) Assignee: MONOLITH ELECTRIC (CHANGZHOU) CO., LTD., Changzhou (CN)

( * ) Notice: Subject to any disclaimer, the term of this patent is extended or adjusted under 35 U.S.C. 154(b) by 207 days.

(21) Appl. No.: 16/083,903

(22) PCT Filed: Jul. 9, 2018

(86) PCT No.: PCT/CN2018/094934
§ 371 (c)(1),
(2) Date: Sep. 11, 2018

(87) PCT Pub. No.: WO2019/184136
PCT Pub. Date: Oct. 3, 2019

(65) Prior Publication Data
US 2020/0208961 A1    Jul. 2, 2020

(30) Foreign Application Priority Data

Mar. 26, 2018    (CN) .......................... 2018 1 0250682

(51) Int. Cl.
*G01B 11/04*    (2006.01)
*G01D 5/347*    (2006.01)

(52) U.S. Cl.
CPC ....... *G01B 11/043* (2013.01); *G01D 5/34746* (2013.01)

(58) Field of Classification Search
CPC .......... G01D 5/34746; G01D 5/34792; G01D 5/34715; G01D 5/26; G01S 17/48;
(Continued)

(56) References Cited

U.S. PATENT DOCUMENTS

| | | | |
|---|---|---|---|
| 7,087,888 B2* | 8/2006 | Atsuta ...................... | G01D 5/36 250/231.13 |
| 7,759,634 B2* | 7/2010 | Tanaka ............... | G01D 5/34746 250/231.13 |

(Continued)

FOREIGN PATENT DOCUMENTS

| CN | 1168968 A | 12/1997 |
|---|---|---|
| CN | 1776372 A | 5/2006 |

(Continued)

*Primary Examiner* — Sang H Nguyen
(74) *Attorney, Agent, or Firm* — Bayramoglu Law Offices LLC

(57) ABSTRACT

A digital displacement sensor and a displacement measuring method thereof, pertaining to the technical field of displacement sensors. The digital displacement sensor includes a housing and a circuit board, and the circuit board is arranged inside the housing. The housing is provided with a window and an opening. The circuit board is provided with a signal acquisition module, an analog front end circuit, a digital compensation circuit, and a signal output interface. The digital displacement sensor allows to alternatively fix the sensor or measured object according to the structure. The measurement can be performed as long as a relative movement between the sensor and the measured object occurs. Factors such as material of the measured object etc. are not limited, so materials such as steel belts, aluminum plates, plastics etc. can be flexibly used. Merely surfaces of the measured object need to be coated with corresponding stripes.

9 Claims, 3 Drawing Sheets

(58) Field of Classification Search
CPC ..... G01S 7/4918; G01B 11/043; G01B 11/02; G01B 11/14; G01B 11/026
USPC .................................... 356/614, 623, 634
See application file for complete search history.

(56) References Cited

U.S. PATENT DOCUMENTS

| | | | | |
|---|---|---|---|---|
| 2002/0021450 A1* | 2/2002 | Aoki | ................. | G01D 5/34715 356/499 |
| 2004/0262505 A1* | 12/2004 | Atsuta | ................. | G01D 5/36 250/231.13 |
| 2005/0179908 A1* | 8/2005 | Wada | ................. | G01P 3/366 356/496 |
| 2006/0267822 A1* | 11/2006 | Ito | ................. | G01D 5/366 341/143 |
| 2008/0315076 A1* | 12/2008 | Kusano | ................. | G01D 5/34746 250/231.1 |
| 2009/0027687 A1* | 1/2009 | Kuroda | ................. | G01D 5/38 356/499 |
| 2011/0069321 A1* | 3/2011 | Fujita | ................. | G01D 5/347 356/614 |
| 2011/0218760 A1* | 9/2011 | Takahama | ................. | G01D 5/244 702/150 |
| 2012/0069323 A1* | 3/2012 | Arimitsu | ................. | G01D 5/2451 356/28 |
| 2012/0104241 A1* | 5/2012 | Toh | ................. | G01D 5/2451 250/231.1 |
| 2012/0162663 A1 | 6/2012 | Kapner | | |
| 2013/0169974 A1* | 7/2013 | Iwayama | ................. | G01B 11/0691 356/601 |
| 2013/0201490 A1* | 8/2013 | Iida | ................. | G01B 11/026 356/614 |
| 2013/0206970 A1* | 8/2013 | Tahara | ................. | G01D 5/35383 250/231.1 |
| 2014/0184202 A1* | 7/2014 | Horiguchi | ................. | G01B 7/003 324/207.11 |
| 2015/0069225 A1* | 3/2015 | Kim | ................. | G01D 5/34792 250/231.1 |
| 2016/0258785 A1* | 9/2016 | Sasaki | ................. | G01D 5/34715 |
| 2017/0153129 A1* | 6/2017 | Sasaki | ................. | G01D 5/3473 |

FOREIGN PATENT DOCUMENTS

| | | |
|---|---|---|
| CN | 102620658 A | 8/2012 |
| CN | 103644834 A | 3/2014 |
| CN | 104075742 A | 10/2014 |
| CN | 205373619 U | 7/2016 |
| CN | 206488745 U | 9/2017 |
| CN | 108195293 A | 6/2018 |
| JP | S59214713 A | 12/1984 |

* cited by examiner

DIGITAL DISPLACEMENT SENSOR AND DISPLACEMENT MEASURING METHOD THEREOF

CROSS REFERENCE TO RELATED APPLICATIONS

This application is the national phase entry of International Application PCT/CN2018094934, filed on Jul. 9, 2018, which is based upon and claims priority to Chinese Patent Application No. 201810250682.X, filed on Mar. 26, 2018, the entire contents of which are incorporated herein by reference.

TECHNICAL FIELD

The present invention pertains to the technical field of displacement sensors, and in particular to a digital displacement sensor and a displacement measuring method thereof.

BACKGROUND

Displacement is a physical attribute that commonly needs to be measured in production and life. The commonly used sensors for measuring displacement include optical grating ruler, capacitive grating scale, resistance scale, or angle encoder after mechanical expansion (e.g. wire-actuated encoder, a conversion from angular displacement to linear displacement) and so on. These displacement measurement sensors are widely used. In most applications, technologies such as optical grating, capacitive grating etc. are applied as components of an integrated equipment. For example, in the measuring process, the whole set of optical grating ruler is integrated into a semi-automatic or automatic equipment. This method has higher requirements on the structure of automation equipment and is costly.

With the development of informatization and digitization, sensors are gradually transitioning from analog sensing elements to digital signal acquisition modules. The digital signal acquisition modules are more and more widely used because of their computing and compensation function and easy system integration.

In hardware design, it is an essential step to convert a sinusoidal signal obtained by the sensor into a square wave signal in signal processing. However, a photoelectric sensor is very sensitive to the change of distance a. As shown in FIG. 1, the change of distance between measured object 11 and traditional sensor 12 has great impact on the generated sensor signal. In a maximum signal interval, if distance changes 0.5 mm, the signal will change more than 20%. When the distance a is larger, the signal of the photoelectric sensor is weaker. When the distance a is smaller, the signal of the photoelectric sensor is stronger.

A traditional method of converting a sinusoidal signal into square wave signal is to input the sinusoidal signal and a direct current signal of a given voltage into a voltage comparator to generate a square wave. However, due to the change of distance, the sinusoidal signal will also change. When the sensor signal is at a peak value, if the distance becomes smaller, the signal waveform moves downward and the peak voltage of the sensor may be less than the given fixed voltage. While, when the sensor signal is at a valley value, if the distance becomes larger, the signal waveform moves upward and the valley voltage of the sensor may be greater than the given fixed voltage. Moreover, since the measured object moves rapidly, it is hard to automatically adjust to an appropriate fixed voltage, rapidly and accurately. With the above-mentioned factors, the sensor cannot generate a stable square wave signal, thereby causing an error in measurement result.

In traditional solution, the signal generated by one sensor is processed to obtain an effective signal. The signal generated by the sensor is affected by many factors in practical applications, such as the impact of the distance a in FIG. 1, the impact of the moving speed relative to the measured object, the impact of temperature and humidity, and the brightness of ambient light, etc. These factors will make the signal generated by the sensor unstable. In the traditional solution, merely the unstable signal itself is processed, while the processed effective signal cannot be stably generated. As a result, errors may occur.

SUMMARY

The objective of the present invention is to provide a digital displacement sensor and a displacement measuring method thereof, which can eliminate the deficiencies of the traditional technology.

In order to achieve the above objective, the technical solution of the present invention is as follows.

A digital displacement sensor includes a signal acquisition module, wherein the signal acquisition module includes at least two photoelectric sensors, the two photoelectric sensors are configured to acquire a first signal and a second signal respectively and send the first signal and the second signal to a signal processing unit; the first signal has wave peaks and wave valleys, and the wave peaks and the wave valleys are periodically distributed; the waveform of the second signal is the same as that of the first signal, and the wave peaks of the first signal correspond to wave valleys of the second signal in the same clock period;

a signal processing unit for generating a third signal, wherein in the same clock period, a descending waveform of the third signal is generated at a first intersection point of the waveforms of the first signal and the second signal, and an ascending waveform of the third signal is generated at a second intersection point of the waveforms of the first signal and the second signal, forming a waveform of the third signal in one clock period; and a data processing unit for counting the ascending waveforms and the descending waveforms of the third signal to digitize a length measurement result.

The signal acquisition module of the present invention is configured with an analog front end circuit. The signal acquisition module and the analog front end circuit constitute a signal acquisition unit, and the signal processing unit is a comparator.

The analog front end circuit includes an amplifier and a peripheral circuit of the amplifier. The two photoelectric sensors are respectively connected to an input end of one analog front end circuit, output ends of the two analog front end circuits are respectively connected to a positive input end and a negative input end of the comparator, and the output end of the comparator is connected to the data processing unit.

The present invention further includes a housing and a circuit board. The housing is provided with a window and an opening. The circuit board is arranged inside the housing. The circuit board is integrated with the data processing unit, the signal processing unit, and the signal acquisition unit. A signal output interface of the data processing unit is connected to a communication cable, and the communication cable extends out of the housing through the opening.

The two photoelectric sensors of the present invention are reflective photo interrupters.

The digital displacement sensor of the present invention is configured to detect the length of the measured object. The measured object is provided with a measurement coating, and the measurement coating includes two stripes with different reflection efficiencies. The widths of the two stripes are the same. During detection, the photoelectric sensor obtains signals by sensing the measurement coating.

The signals detected by the two photoelectric sensors of the present invention are sinusoidal wave signals, and the signal output by the comparator is the square wave signal. A phase difference of the sinusoidal wave signals detected by the two photoelectric sensors is 180 degrees during detection.

The present invention also provides a displacement measuring method using the above-mentioned digital displacement sensor which includes the following steps:

(1) obtaining a first signal and a second signal by two photoelectric sensors, respectively and sending the first signal and second signal to a signal processing unit, wherein, the first signal includes wave peaks and wave valleys, the wave peaks and the wave valleys are periodically distributed; a waveform of the second signal is the same as that of the first signal; and in the same clock period, the wave peaks of the first signal correspond to wave valleys of the second signal;

(2) obtaining a third signal by the signal processing unit according to the first signal and the second signal, wherein, in the same clock period, a descending waveform of the third signal is generated at a first intersection point of the waveforms of the first signal and the second signal; an ascending waveform of the third signal is generated at a second intersection point of the waveforms of the first signal and the second signal, forming a waveform of the third signal in one clock period;

(3) counting the ascending waveforms and the descending waveforms of the third signal by the data processing unit and determining a displacement direction to digitize a length measurement result.

The two photoelectric sensors of the present invention are reflective photo interrupters. The signal processing unit is a comparator. The data processing unit is an ARM controller. Both, the first signal and the second signal obtained by the two photoelectric sensors are sinusoidal wave signals, the third signal generated by the comparator is a square wave signal, and ascending edges and descending edges of the square wave signal are counted by the ARM controller to realize a digitization of length measurement results.

In the present invention, during measurement, a phase difference between the first signal and the second signal is 180 degrees.

In the digital displacement sensor of the present invention, the square wave signal is obtained by two complementary signals, so the measurement is more reliable because the third signal is generated based on the intersection of the waveforms of the first signal and the second signal in the measurement, and the intersection position of the waveforms of the first signal and the second signal depends on the width and distance of the bright layer and the dark layer on the measurement coating. The width and distance can be artificially designed and have constancy, so that the third signal will not be affected by the changes of the distance a during the same clock period. If the distance a in FIG. 1 changes, amplitudes of the waveforms of the first signal and the second signal will change simultaneously, while the intersection position of the two waveforms will not change, so the third signal itself will not be affected. Similarly, the digital displacement sensor of the present invention will not be affected by factors such as the moving speed of the measured object, temperature and humidity, brightness of ambient light, etc.

The digital displacement sensor and the displacement measuring method thereof provided by the present invention realizes a displacement sensor which allows to alternatively fix the sensor or measured object according to the structure and can perform the measurement as long as there is a relative movement between the sensor and the measured object. Factors such as material of the measured object etc. are not limited, so materials such as steel belts, aluminum plates, plastics etc. can be flexibly used. Merely surfaces of the measured object need to be coated with corresponding stripes. The sensor itself can perform digital processing and digitally compensate the environmental errors. Since the sensor does not contact with the measured object, there is no mechanical wear and tear, so the service life is longer. The present invention has a simple structure, low cost, and the sensor accuracy can be adjusted by placing multiple groups of sensing elements, thereby greatly reducing the requirement on the stability of the signal quantity of the sensor.

Figure 1:
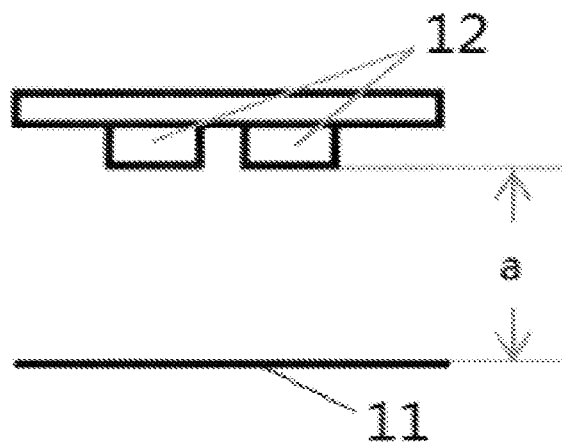
FIG. 1 is a drawing of the prior art.

Reference designators in the drawings are as follows: photoelectric sensor 1, housing 2, circuit board 3, signal acquisition module 3a, analog front-end circuit 3b, signal processing unit 3c, data processing unit 3d, signal acquisition unit 3e, communication cable 4, measurement coating 5, window 6, opening 7, digital displacement sensor 10, measured object 11, traditional sensor 12.

DETAILED DESCRIPTION

Figure 2:
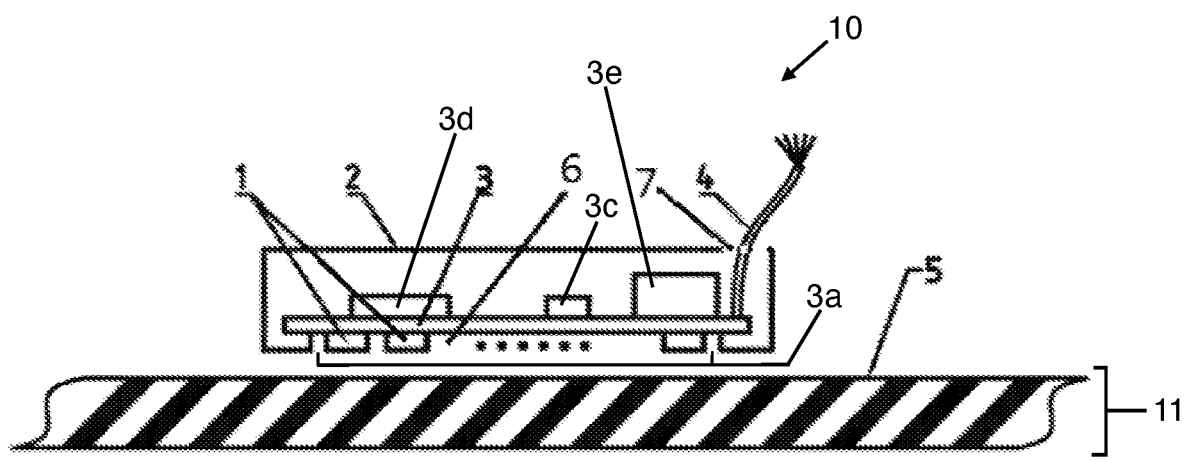
FIG. 2 is a structural schematic diagram of the present invention.
Figure 3:
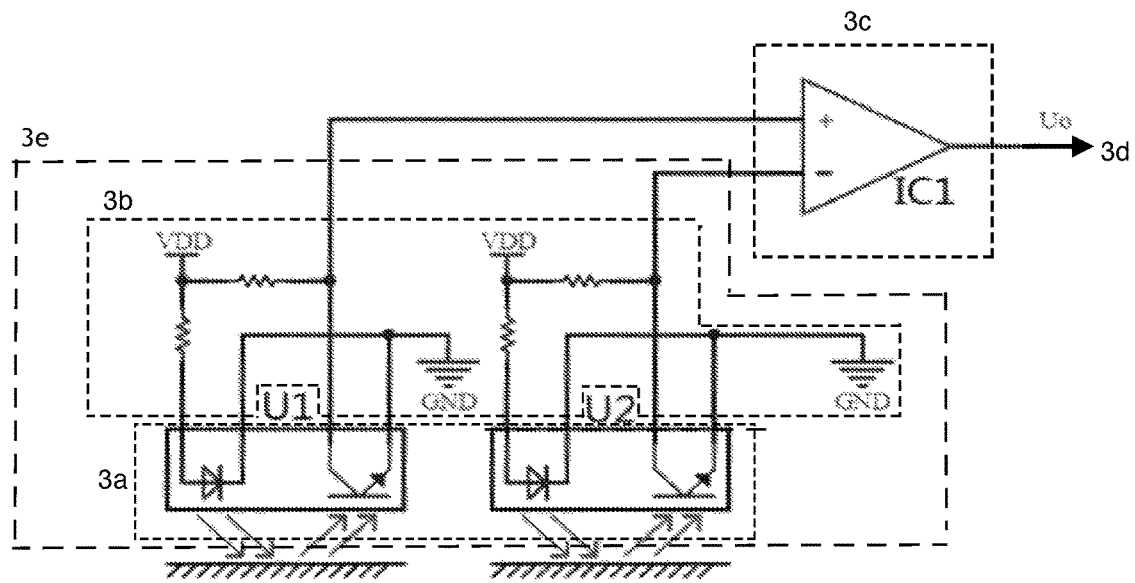
FIG. 3 is a circuit diagram of the signal acquisition module of the present invention.
Figure 4:
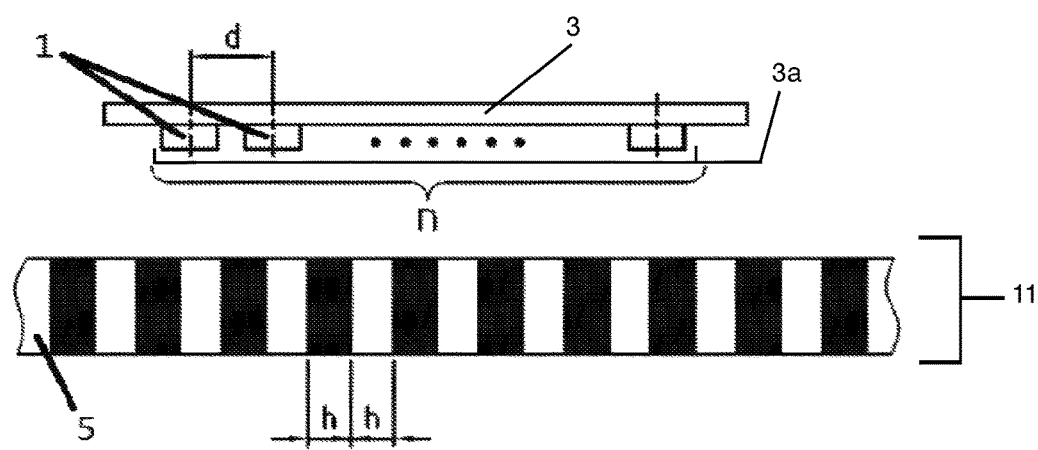
FIG. 4 is a mathematical model diagram showing the calculation of the spacing between photoelectric sensors of the present invention.

As shown in FIGS. 2-4, a digital displacement sensor 10 includes a signal acquisition module 3a, a signal processing unit 3c, a data processing unit 3d, and a signal acquisition unit 3e.

The signal acquisition module 3a includes at least two photoelectric sensors. The two photoelectric sensors are configured to acquire a first signal and a second signal respectively and send the first signal and second signal to a signal processing unit 3c. The first signal includes wave peaks and wave valleys. The wave peaks and wave valleys are periodically distributed. The waveform of the second signal is the same as that of the first signal, and in the same clock period, the wave peaks of the first signal correspond to wave valleys of the second signal.

The signal processing unit 3c is configured to generate a third signal. In the same clock period, a descending waveform of the third signal is generated at a first intersection point of the waveforms of the first signal and the second signal and an ascending waveform of the third signal is generated at a second intersection point of the waveforms of the first signal and the second signal, in this way, a waveform of the third signal in one clock period is formed. It should be noted that the ascending waveform of the third signal may be generated at the first intersection point of the waveforms of the first signal and the second signal and the descending waveform of the third signal may be generated at the second intersection point of the waveforms of the first signal and the second signal through a software method or a combination of software and hardware, thus forming the waveform of the third signal within one clock period.

The data processing unit $3d$ is used for counting the ascending waveforms and the descending waveforms of the third signal to digitize the length measurement results.

The signal acquisition module $3a$ is configured with an analog front-end circuit $3b$. The signal acquisition module $3a$ and the analog front-end circuit $3b$ constitute a signal acquisition unit $3e$. The signal processing unit $3c$ is a comparator. It should be noted that the signal processing unit $3c$ of this embodiment includes, but is not limited to, the comparator. Other modules that implement the functions of the comparator through software or a combination of hardware and software are included herein, and they are not limited.

The analog front end circuit $3b$ includes an amplifier and a peripheral circuit of the amplifier. The two photoelectric sensors are respectively connected to an input end of one analog front end circuit. The output ends of the two analog front-end circuits $3b$ are respectively connected to a positive input end and a negative input end of the comparator, and the output end of the comparator is connected to a data processing unit $3d$. Specifically, referring to FIG. 3, the two photoelectric sensors includes a first photoelectric sensor U1 and a second photoelectric sensor U2, respectively. The output ends of the first photoelectric sensor U1 and the second photoelectric sensor U2 are respectively connected to the positive input end and the negative input end of the comparator IC1 through two amplifiers, and the output end of the comparator IC1 is connected to a signal output interface.

The digital displacement sensor 10 of this embodiment further includes housing 2 and circuit board 3. Housing 2 is provided with window 6 and opening 7. Circuit board 3 is arranged inside housing 2. Circuit board 3 is integrated with a data processing unit $3d$, a signal processing unit $3c$, and a signal acquisition unit $3e$. The signal output interface of the data processing unit $3d$ is connected to communication cable 4, and communication cable 4 extends out of housing 2 through opening 7.

The data processing unit $3d$ of this embodiment is an ARM controller, and the two photoelectric sensors are reflective photo interrupters.

The digital displacement sensor 10 of this embodiment is configured to detect the length of the measured object 11. As shown in FIG. 2 and FIG. 4, the measured object 11 is provided with measurement coating 5. The measurement coating 5 includes two stripes with different reflection efficiencies, and the widths of the two stripes are the same. During detection, the photoelectric sensor obtains signals by sensing measurement coating 5. Preferably, the distance of the spacing between the signal acquisition module $3a$ and measured object 11 ranges from 0.1 mm to 0.5 mm. For example, measurement coating 5 includes a bright layer and a dark layer, the bright layer is printed on the measured object 11 by using a bright color pigment, and the dark layer is printed on the measured object 11 by using a dark color pigment. The photoelectric sensor senses the bright layer and the dark layer on the measured object 11 to obtain signals. Certainly, the manufacturing method of measurement coating 5 and the coating used are not limited thereto.

The signals detected by the two photoelectric sensors of this embodiment are sinusoidal wave signals. The signal output by the comparator is the square wave signal. The phase difference of the sinusoidal wave signals of the two photoelectric sensors is 180 degrees during detection. It should be noted that sinusoidal wave signals and square wave signals are merely one implementation among the embodiments.

In order to obtain the corresponding 180-degree phase difference, the distance of the photoelectric sensor in this embodiment is designed as follows: $d=h+x\cdot 2\cdot h$, where d is the distance between the center points of the two photoelectric sensors, h is the width of a single stripe, x is a natural number and its physical meaning is the number of cycles. Referring to FIG. 4, the two stripes of light layer and dark layer enable the photoelectric sensors to obtain a sinusoidal wave waveform of one cycle, and the length of half cycle is h. According to the formula, it can be determined that the distance between the center points of the two photoelectric sensors is $(2\cdot x+1)h$. Namely, when the distance between the center points of the two photoelectric sensors is an odd multiple of the length of half cycle, the phase difference between the two signals can be ensured to be 180 degrees.

In order to improve the measurement accuracy, in this embodiment, a plurality of data acquisition units may be used to collect data and then obtain a plurality of square wave signals to produce the final result. The specific design method is as follows. First, the measurement accuracy is determined, the measurement accuracy is expressed by formula $D=h/n$, where n is the number of data acquisition units. After the measurement accuracy of the digital displacement sensor 10 has been set, the width of the stripes and the number of data acquisition units may be adjusted according to actual requirements, and finally the reasonable width of the stripes and the number of data acquisition units are determined. Second, the distance between the data acquisition units are determined by the following formula: $d'=h/n+x\cdot 2\cdot h$, where d' refers to the distance between the center points of two data acquisition units, h is the width of a single stripe, x is a natural number, and its physical meaning is the number of cycles.

Figure 5:
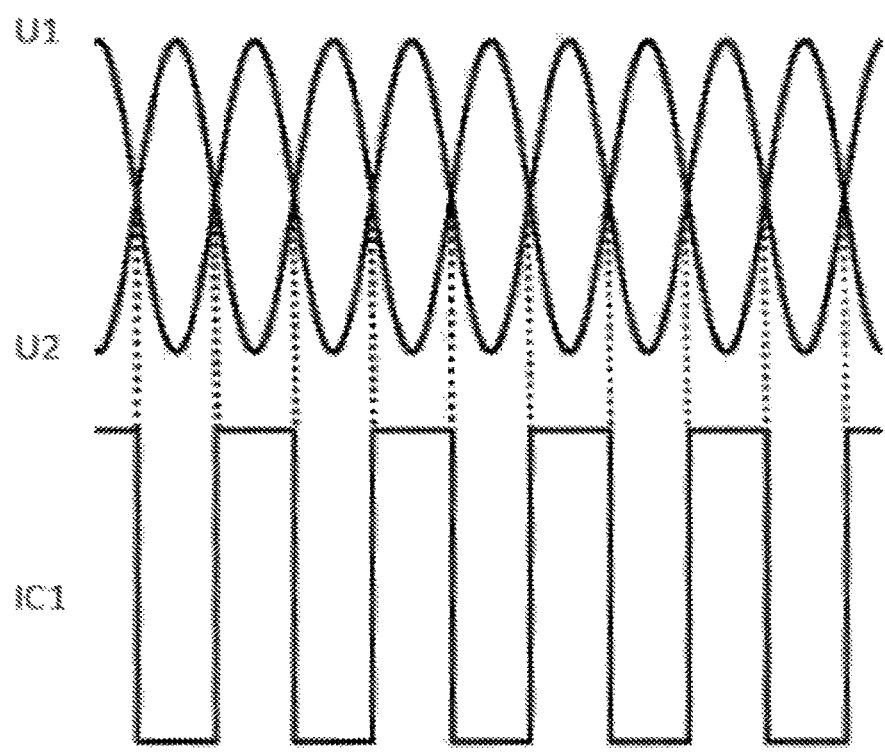
FIG. 5 is a diagram showing the waveforms of the first signal, the second signal, and the third signal of the present invention.

According to the digital displacement sensor 10 of the present invention, a square wave signal is obtained through two complementary signals, so the measurement is more reliable. Referring to FIG. 5, the third signal is generated based on the intersection of the waveforms of the first signal and the second signal during the measurement. While, the intersection position of the waveforms of the first signal and the second signal depends on the width and the distance of the two stripes on measurement coating 5. The width and the distance can be artificially designed and have constancy. Therefore, in the same clock period, the third signal will not be affected by the changes of the distance a. If the distance a in FIG. 1 changes, amplitudes of the waveforms of the first signal and the second signal will change simultaneously, while the intersection position of the two waveforms will not change, so the third signal itself will not be affected. Similarly, the digital displacement sensor 10 of the present invention will not be affected by factors such as the moving speed of the measured object 11, temperature and humidity, brightness of ambient light, etc.

Referring to FIG. 5, the present embodiment also provides a displacement measuring method using the above-mentioned digital displacement sensor 10 which includes the following steps.

(1) During measurement, the two photoelectric sensors respectively obtain the first signal and the second signal and send the first signal and second signal to the signal processing unit 3c. The first signal includes wave peaks and wave valleys which are periodically distributed. The waveform of the second signal is the same as that of the first signal. In the same clock period, the wave peaks of the first signal correspond to the wave valleys of the second signal.

(2) The signal processing unit 3c obtains the third signal according to the first signal and the second signal. In the same clock period, the descending waveform of the third signal is generated at the first intersection point of the waveforms of the first signal and the second signal and the ascending waveform of the third signal is generated at the second intersection point of the waveforms of the first signal and the second signal, forming the waveform of the third signal in one clock period.

(3) The data processing unit 3d counts the ascending waveforms and the descending waveforms of the third signal to digitize the length measurement results.

During the use, the digital displacement sensor 10 has no contact with the measured object 11, and a fixed distance is maintained between the digital displacement sensor 10 and the measured object 11. The surfaces of the measured object 11 are uniformly coated with two or more stripes or patterns with different reflection efficiencies, such as stripe pattern where black alternates with white. When a relative displacement between the digital displacement sensor 10 and the measured object 11 occurs, the stripes move relative to the signal acquisition module 3a, and the optical signal emitted by the signal acquisition module 3a changes, so that the pulse signals or sinusoidal signals are detected. Subsequently, the signal processing unit 3c and the digital processing unit determine the movement direction and the displacement in the direction perpendicular to the stripes through analysis.

The linear displacement measured by the sensor is the relative displacement between the sensor body and the measured object 11, namely, no matter the sensor body is fixed or the measured object 11 is fixed, the displacement can be measured as long as a relative displacement occurs.

According to the present invention, two photoelectric sensors 1 are included in a group to form the signal acquisition module 3a, i.e. the first photoelectric sensor U1 and the second photoelectric sensor U2. Sinusoidal signals generated by the first photoelectric sensor U1 and the second photoelectric sensor U2 are directly used as inputs of the voltage comparator IC1. In this way, a stable square wave signal can be generated. When the distance a in FIG. 1 changes, the two inputs of comparator IC1 will change simultaneously, so as to ensure a certain synchronicity. Therefore, the impacts caused by the distance can be well compensated by using this method. When the distance a changes, the voltage signals generated by the two photoelectric sensors 1 will move upward or downward simultaneously.

Since there is a 180-degree phase difference between the two photoelectric sensors 1, when the voltage signal generated by the first photoelectric sensor U1 is at a peak value, the voltage signal generated by the second photoelectric sensor U2 is at a valley value, so the voltage signal generated by the first photoelectric sensor U1 will definitely be greater than the voltage signal generated by the second photoelectric sensor U2. While, when the voltage signal generated by the first photoelectric sensor U1 is at a valley value, the voltage signal generated by the second photoelectric sensor U2 is at a peak value, so the voltage signal generated by the first photoelectric sensor U1 will definitely be smaller than the voltage signal generated by the second photoelectric sensor U2. Accordingly, sinusoidal wave signals obtained by the two photoelectric sensors will have a periodic intersection. A stable square wave signal can be generated according to the characteristics of the periodic intersection. In order to further improve the accuracy, a plurality of square wave signals generated by a plurality of signal acquisition modules 3a can be used to generate the final result.

The digital displacement sensor 10 and the displacement measuring method thereof provided by the present invention realizes a displacement sensor which allows to fix the sensor or fix the measured object 11 in flexible according to the structure and can perform the measurement as long as there is a relative movement between the sensor and the measured object 11. Factors such as material of the measured object 11 etc. are not limited, so materials such as steel belts, aluminum plates, plastics etc. can be flexibly used. Merely surfaces of the measured object 11 need to be coated with corresponding stripes. The sensor itself can perform digital processing and digitally compensate the environmental errors. Since the sensor does not contact with the measured object 11, there is no mechanical wear, so the service life is longer. The present invention has a simple structure, low cost, and the sensor accuracy can be adjusted by placing multiple groups of sensing elements, thereby greatly reducing the requirement on the stability of the signal quantity of the sensor.

What is claimed is:

1. A digital displacement sensor, comprising:
    a signal acquisition module, wherein the signal acquisition module includes at least two photoelectric sensors, the two photoelectric sensors are configured to acquire a first signal and a second signal respectively and send the first signal and the second signal to a signal processing unit, the first signal includes wave peaks and wave valleys, the wave peaks and the wave valleys are periodically distributed, a waveform of the second signal is the same as a waveform of the first signal, and in a same clock period, the wave peaks of the first signal correspond to wave valleys of the second signal;
    the signal processing unit for generating a third signal, wherein in the same clock period, a descending waveform of a third signal is generated at a first intersection point of the waveforms of the first signal and the second signal and an ascending waveform of the third signal is generated at a second intersection point of the waveforms of the first signal and the second signal, forming a waveform of the third signal in one clock period; and
    a data processing unit for counting the ascending waveforms and the descending waveforms of the third signal to digitize a length measurement result; and
    a digital displacement sensor configured to detect a length of a measured object, the measured object is provided with a measurement coating, the measurement coating includes two stripes with different reflection efficiencies, widths of the two stripes are the same, and the photoelectric sensors obtain signals by sensing the measurement coating in a detection.

2. The digital displacement sensor according to claim 1, wherein the signal acquisition module is configured with an analog front end circuit, the signal acquisition module and the analog front end circuit constitute a signal acquisition unit, and the signal processing unit is a comparator;
    the analog front end circuit includes an amplifier and a peripheral circuit of the amplifier, the two photoelectric sensors are respectively connected to an input end of one analog front end circuit, output ends of the two analog front end circuits are respectively connected to a positive input end and a negative input end of the comparator, and an output end of the comparator is connected to the data processing unit.

3. The digital displacement sensor according to claim 1, further comprising:
a housing and a circuit board, wherein the housing is provided with a window and an opening, the circuit board is arranged inside the housing, the circuit board is integrated with the data processing unit, the signal processing unit, and a signal acquisition unit; a signal output interface of the data processing unit is connected to a communication cable, and the communication cable extends out of the housing through the opening.

4. The digital displacement sensor according to claim 1, wherein the two photoelectric sensors are reflective photo interrupters.

5. The digital displacement sensor according to claim 1, wherein detection signals of the two photoelectric sensors are sinusoidal wave signals, a signal output by the comparator is a square wave signal, and a phase difference of the sinusoidal wave signals of the two photoelectric sensors is 180 degrees during detection.

6. A displacement measuring method using the digital displacement sensor according to claim 1, comprising the following:
(1) obtaining the first signal and the second signal by the two photoelectric sensors respectively and sending the first signal and second signal to the signal processing unit, wherein, the first signal includes the wave peaks and the wave valleys, the wave peaks and the wave valleys are periodically distributed; the waveform of the second signal is the same as the waveform of the first signal; and in the same clock period, the wave peaks of the first signal correspond to wave valleys of the second signal;
(2) obtaining the third signal by the signal processing unit according to the first signal and the second signal, wherein, in the same clock period, the descending waveform of the third signal is generated at the first intersection point of the waveforms of the first signal and the second signal; the ascending waveform of the third signal is generated at the second intersection point of the waveforms of the first signal and the second signal, forming the waveform of the third signal in one clock period;
(3) counting the ascending waveforms and the descending waveforms of the third signal by the data processing unit to digitize a length measurement result.

7. The displacement measuring method according to claim 6, wherein the two photoelectric sensors are reflective photo interrupters, the signal processing unit is a comparator, the data processing unit is an ARM controller, the first signal and the second signal obtained by the two photoelectric sensors are sinusoidal wave signals, the third signal generated by the comparator is a square wave signal, and ascending edges and descending edges of the square wave signal are counted by the ARM controller to realize a digitization of the length measurement result.

8. The displacement measuring method according to claim 6, wherein a phase difference between the first signal and the second signal is 180 degrees in a measurement.

9. The displacement measuring method according to claim 7, wherein a phase difference between the first signal and the second signal is 180 degrees in a measurement.

\* \* \* \* \*